3 Sheets—Sheet 1.

W. L. SWEETLAND.

Lathe Chuck.

No. 9,734. Reissued May 31, 1881.

Witnesses.

S. Harrison Wagner.

F. Chillingworth

Inventor.

W. L. Sweetland

N. PETERS, Photo-Lithographer, Washington, D. C.

W. L. SWEETLAND.

Lathe Chuck.

No. 9,734. Reissued May 31, 1881.

Witnesses.
S. Harrison Wagner
F. Chillingworth

Inventor.
W. L. Sweetland

N. PETERS, Photo-Lithographer, Washington, D. C.

W. L. SWEETLAND.

Lathe Chuck.

No. 9,734. Reissued May 31, 1881.

Witnesses.
S. Harrison Hagner
F. Chillingworth

Inventor.
W. L. Sweetland

N. PETERS, Photo-Lithographer, Washington, D. C.

UNITED STATES PATENT OFFICE.

WILLIAM L. SWEETLAND, OF WINDSOR LOCKS, CONNECTICUT.

LATHE-CHUCK.

SPECIFICATION forming part of Reissued Letters Patent No. 9,734, dated May 31, 1881.

Original No. 211,943, dated February 4, 1879. Application for reissue filed April 25, 1881.

*To all whom it may concern:*

Be it known that I, WILLIAM L. SWEETLAND, of Windsor Locks, in the county of Hartford and State of Connecticut, have invented certain new and useful Improvements Pertaining to Lathe-Chucks, of which the following is a true and full specification.

The accompanying drawings illustrate the invention, wherein—

Figure 1:
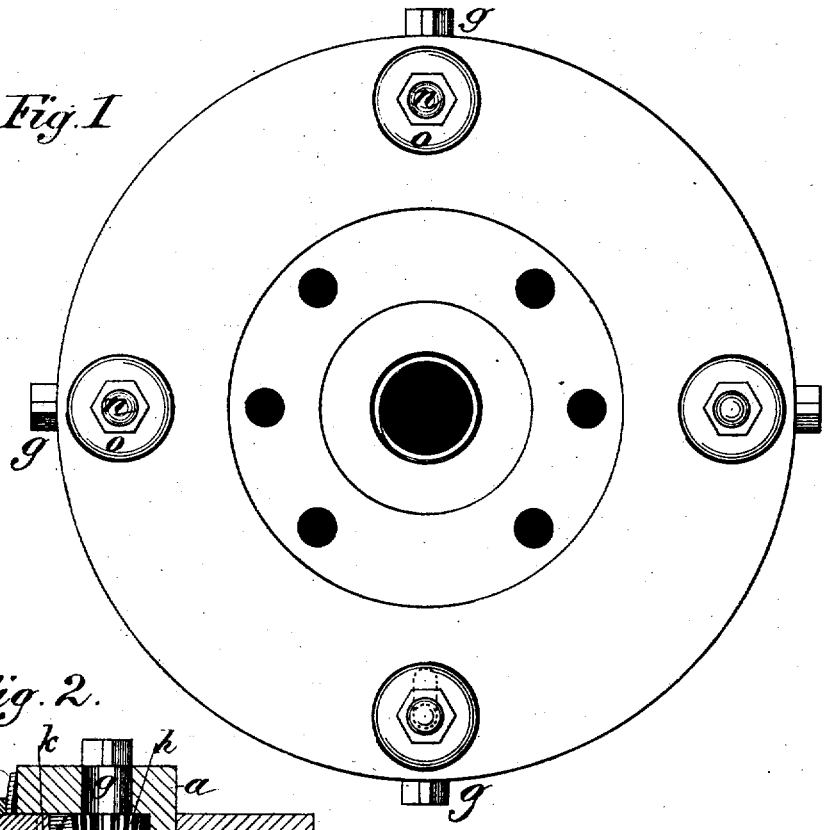
Figure 2:
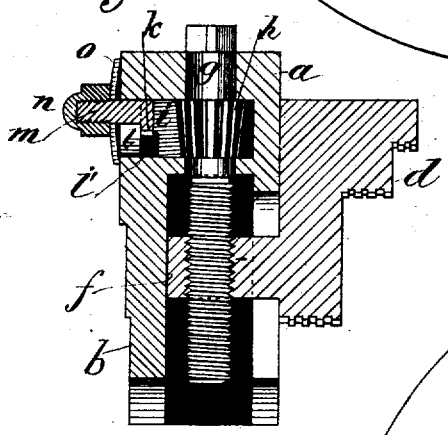
Figure 3:
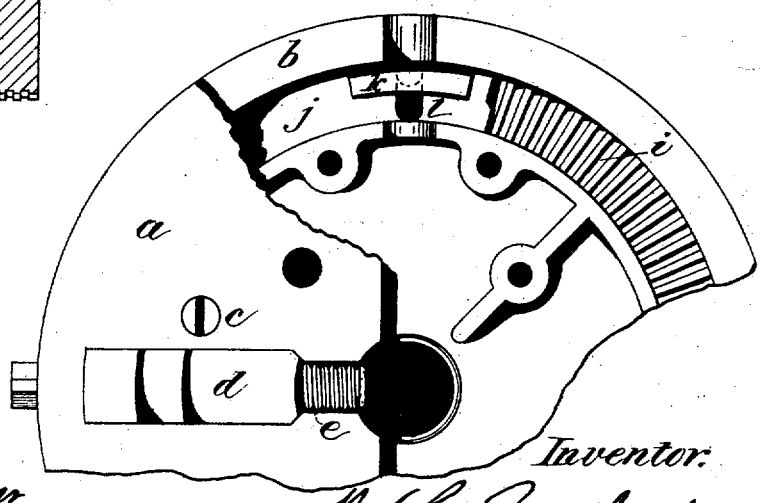

Plate 1: Figure 1 is a view of the rear face of the chuck. Fig. 2 is a view of the chuck in central cross-section. Fig. 3 is a view showing a portion of the interior face of the rear half of the chuck-body.

Figure 4:
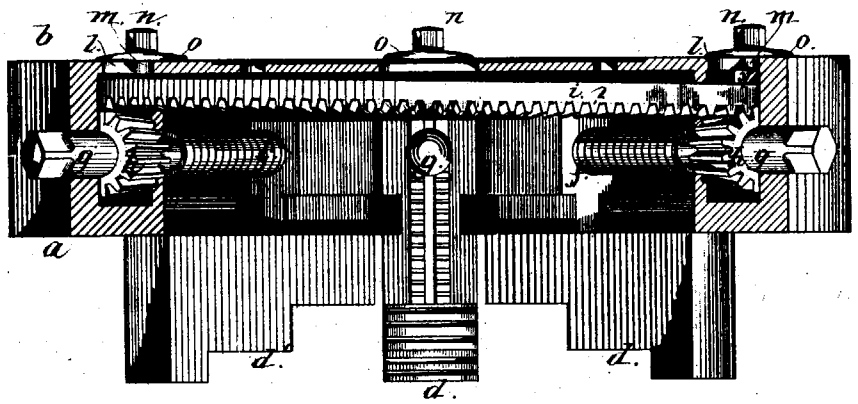

Plate 2: Fig. 4 is a plan view of the chuck, showing its interior mechanism, with annular gear in and out of mesh with the pinions.

Figure 5:
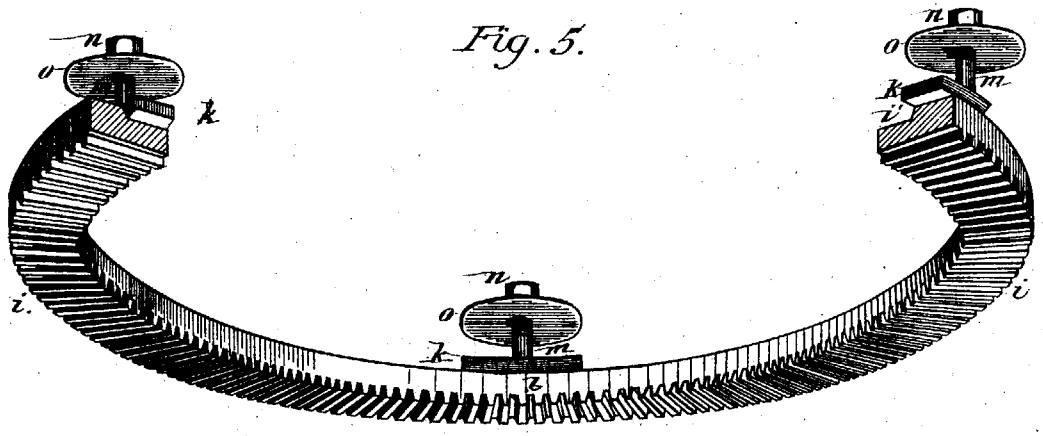

Plate 3: Fig. 5 is a view of the grooved annular gear, with the front broken away to show the position of the cam-blocks.

This invention is an improvement on the well-known Horton chuck, and its object is to give the chuck an independent as well as a universal action; and it consists in the peculiar means used for attaining this end, there being now other chucks having independent as well as universal action.

The body of the chuck is composed of two halves, *a b*, held together by suitable screws *c*. The letters *d* denote the jaws, (commonly four in number,) having a radial motion in radial slots *e* cut in the front half, *a*, of the chuck-body. These jaws bear on the back nuts, *f*, running on the threaded shafts *g*, which reach outside the periphery of the chuck-body, and are there squared off to afford a hold for the wrench whereby they are turned. These shafts bear the beveled pinions *h*, into all of which meshes the annular gear *i*, lying in an annular groove, *j*, made in the rear half, *b*, of the chuck-body. This arrangement renders the chuck universal.

So far I have described the "Horton chuck," so called.

Now, as to my improvement, I make the gear or rack *i* with a continuous groove or bevel, *i'*, to match the incline of the sliding cam-blocks *k*, as shown in Plate 3. These blocks are also beveled to match the grooves or bevel of the annular gear *i*, and are furnished on their back with posts *m*, which run through and have play in the radial slots *l*. The rear ends of the posts *m* are threaded and take upon them the nuts *n*, which keep the cam-blocks in place and form a handle or gripe whereby the operator may move them to and fro in the slot *l* to engage or release the annular gear *i* in or out of the pinions *h*. When they are moved toward the center of the chuck the gear *i* is released from the pinion *h*. The annular groove being wide and deep enough, the gear *i* drops out of mesh, as shown in Plate 2, thus liberating the pinion, and with it the jaw *d'*, giving it an independent motion, while the other pinions are held in mesh and are universal in their action.

If all the cam-blocks *k* are moved toward the center, each and all of the jaws thereby become released from the action of the gear *i*, and are then independent in their action each from the other. When this takes place the chuck then becomes what is known as an "independent chuck."

When the cam-blocks *k* are moved from the center toward the outer edge of the chuck they force and lock the gear *i* into mesh with the pinions *h*. This action makes it a universal chuck; but if it is desired to gripe or chuck a crooked or irregular piece of work, one or two of these jaws can be instantly made independent, as described, adjusted to fit this work, and again be made instantly universal with the other jaws.

A convex spring-washer, *o*, is placed under the nut *n* for the purpose of giving sufficient friction or tension to the cam-blocks *k*, and to prevent the centrifugal force of the chuck, when revolving, from moving them from their proper position, and also to prevent the accidental displacement of parts used in engaging or disengaging the annular gear *i* with the pinions *h*. These spring-washers *o* are intended also to cover the slots *l* as guard-plates, to prevent the entrance of dirt, chips, or any foreign substance into the gear-chamber or annular groove *j*, which would seriously interfere with the working of the chuck.

The washer *o*, when simply used as a cover to the slot *l*, may be of one piece with the nut, or it may be made without elasticity. It can also be applied within the groove *j*, or of other than a circular form, and substantially the same effect produced; but I prefer to make it of a circular convex form, so that only its outer edges may have a bearing upon the chuck-shell *b*, held firmly by the nut *n* on the post which passes through the washer.

I am aware that chucks have heretofore been made with a ring placed back of the annular gear and operated circumferentially to carry the gear in and out of mesh. The disadvantages of that system are cost of manufacture, increased weight and thickness of chuck, or a reduced thickness of gear to make room for the ring, thereby greatly reducing the strength of one of the most important parts of the chuck; and when, as often happens, the ring and gear become gummed or rusted together their large bearing-surfaces make it very difficult to operate them. In this construction, also, when the ring is used to disengage the gear from the pinions it liberates them all, and cannot be used to unmesh the particular pinion or pinions which it may be desired to operate independently of the gear, as can be done in my invention by moving the posts *m*, with the cam-blocks radially, one at a time, toward the chuck-center. Again, in replacing the gear into mesh with the pinions by the use of the ring, practice has proved that the teeth of the gear and pinions do not always come together in mesh. Then it becomes necessary to turn each pinion until the one or more which does not engage is found, and in turning the pinions to accommodate the gear the jaws are more or less thrown out of center and cannot be restored without making all of them independent; but by my invention the cam-blocks K, operating radially under each jaw *d* and pinions *h*, so that they severally can be locked in and out of mesh by moving one-quarter of an inch, the jaws may be moved to the degree requisite to gripe or loosen, as occasion may require, and that with great economy of time and labor.

What I claim as my invention is—

1. The combination of the tension-spring washer and a cam operated by a stud or bolt passing through a slot in a lathe-chuck, substantially as set forth.

2. The circular gear provided with an uninterrupted annular bevel or incline plane, serving the purpose of a cam, adapted to be used in connection with a cam operated by a stud passing through a slot in the shell of a lathe-chuck, as and for the purpose set forth.

3. A chuck having an independent cam attached to a stud placed under each of the pinions, by which the annular gear may be thrown in or out of mesh with a part of said pinions, while the others remain in mesh, substantially as and for the purpose set forth.

4. The combination of the chuck-body *a b*, jaws *d*, threaded shaft *g*, bearing pinions *h*, annular gear *i*, with bevel cam-blocks *k*, attached to posts *m*, moving radially in the slots *l*, the nuts *n*, and spring-washers *o*, all substantially as shown and described.

5. The combination of spring-washer *o* with stud *m*, chuck-shell *b*, and the working parts of a lathe-chuck, all constructed and arranged to engage and disengage an annular gear, *i*, in or out of mesh with pinion *h*, substantially as and for the purpose set forth.

W. L. SWEETLAND.

Witnesses:
S. HARRISON WAGNER,
F. CHILLINGWORTH.